United States Patent
Takai et al.

(10) Patent No.: US 6,645,571 B1
(45) Date of Patent: Nov. 11, 2003

(54) PROCESS FOR PRODUCING CERAMIC POROUS BODIES HAVING HOLLOW STRUCTURES AT LOW TEMPERATURES

(75) Inventors: Osamu Takai, Aichi Pref. (JP); Hiroyuki Sugimura, Aichi Pref. (JP); Atsushi Hozumi, Aichi Pref. (JP)

(73) Assignee: Nagoya University, Nagoya (JP)

( * ) Notice: Subject to any disclaimer, the term of this patent is extended or adjusted under 35 U.S.C. 154(b) by 148 days.

(21) Appl. No.: 09/657,398

(22) Filed: Sep. 8, 2000

(30) Foreign Application Priority Data

Sep. 9, 1999 (JP) .......................................... 11-255280

(51) Int. Cl.[7] .............................. B05D 3/06; B05D 5/00; C08J 7/12
(52) U.S. Cl. .................. 427/553; 427/243; 427/245
(58) Field of Search ................. 427/553, 243, 427/245, 246, 554, 555, 556

(56) References Cited

U.S. PATENT DOCUMENTS

| | | | | |
|---|---|---|---|---|
| 5,128,114 A | * | 7/1992 | Schwartz | 423/335 |
| 5,250,282 A | * | 10/1993 | Kresge et al. | 423/705 |
| 5,310,648 A | * | 5/1994 | Arnold et al. | 435/5 |
| 5,538,710 A | * | 7/1996 | Guo et al. | 423/702 |
| 5,622,684 A | * | 4/1997 | Pinnavaia et al. | 423/702 |
| 5,770,275 A | * | 6/1998 | Raman et al. | 427/535 |
| 5,853,866 A | * | 12/1998 | Watanabe et al. | 427/214 |
| 5,858,457 A | * | 1/1999 | Brinker et al. | 427/162 |
| 5,958,577 A | * | 9/1999 | Sugimoto et al. | 428/333 |
| 6,310,110 B1 | * | 10/2001 | Markowitz et al. | 521/99 |
| 6,387,453 B1 | * | 5/2002 | Brinker et al. | 427/245 |
| 6,565,763 B1 | * | 5/2003 | Asakawa et al. | 216/56 |
| 2002/0127386 A1 | * | 9/2002 | Ogawa et al. | 428/315.5 |
| 2002/0127498 A1 | * | 9/2002 | Doshi et al. | 430/322 |
| 2003/0044149 A1 | * | 3/2003 | Fraval et al. | 385/125 |

FOREIGN PATENT DOCUMENTS

EP 0 676 383 A2 10/1995

OTHER PUBLICATIONS

*Webster's Ninth New Collegiate Dictionary*, Merriam–Webster, Inc. excerpt. p. 749, 1990 No month.*
McGinniss "LightSources", excerpt p. 96–99 from *UV Curing: Science and Technology*, edited by S.P. Pappas, Ph.D., Tech. Marketing Corp., Stamford, Conn., 1978 (No month).*
Makoto Ogawa: "Preparation of Mesoporous silica by Supermolecular Templating Mechanisms", Coloring Materials, vol. 71, No. 10, 1998, pp. 646–655, Japan (abstract).
SU 1629289, Feb. 23, 1991.
JP 10279362 Oct. 20, 1998, Japan (abstract only).

* cited by examiner

Primary Examiner—Marianne Padgett
(74) Attorney, Agent, or Firm—Knobbe Martens Olson & Bear, LLP (57) ABSTRACT

A process for producing the ceramic porous body comprising the steps of (1) forming micelles in liquid by mixing ① surfactant molecules, ② surfactant molecules and given organic molecules, or ③ different kinds of surfactant molecules, (2) forming a precursor of a ceramic porous body having an organic-inorganic structure is formed through mixing a ceramic material or a precursor of the ceramic material into the liquid containing the micelles, the precursor of the ceramic porous body comprising a template having the micelles arranged in a hexagonal, cubic or lamella form and the ceramic material or the ceramic material precursor adsorbed around the micelles, (3) removing the surfactant molecules or the surfactant molecules and the given organic molecules in the precursor of the ceramic porous body by photo-oxidation through irradiating vacuum ultraviolet light upon the precursor to leave an inorganic skeleton alone, and (4) thereby forming the ceramic porous body having nanometer-scale pores at a low temperature.

12 Claims, 5 Drawing Sheets

FIG. 2

(a) Cubic form (b) Lamella form

PROCESS FOR PRODUCING CERAMIC POROUS BODIES HAVING HOLLOW STRUCTURES AT LOW TEMPERATURES

BACKGROUND OF THE INVENTION (1) Technical Field of the Invention

The present invention provides a process for producing the ceramic porous body comprising the steps of (1) forming micelles in liquid by mixing ① surfactant molecules, ② surfactant molecules and given organic molecules, or ③ different kinds of surfactant molecules, (2) forming a precursor of a ceramic porous body having an organic-inorganic structure is formed through mixing a ceramic material or a precursor of the ceramic material into the liquid containing the micelles, the precursor of the ceramic porous body comprising a template having the micelles arranged in a hexagonal, cubic or lamella form and the ceramic material or the ceramic material precursor adsorbed around the micelles, (3) removing the surfactant molecules or the surfactant molecules and the given organic molecules in the precursor of the ceramic porous body by photo-oxidation through irradiating vacuum ultraviolet light upon the precursor to leave an inorganic skeleton alone, and (4) thereby forming the ceramic porous body having nanometer-scale pores at a low temperature.

(2) Related Art Statement

The ceramic porous bodies are expected to be used in various fields including absorption and separation. According to the IUPAC's classification, the porous bodies are classified into microporous solids having pore diameters of 2 nm or less, mesoporous solids having pore diameters of 2 to 50 nm and macroporous bodies having pore diameters of 50 nm or more. If the pore diameters can be arbitrarily and finely controlled, the ceramic porous bodies can be expected to be selectively applied as adsorption materials, catalyst materials, high separation materials, etc.

As a process for producing a mesoporous or macroporous material, it is proposed that micelles of surfactant molecules and given organic molecules coexisting therewith, or micelles of different kinds of surfactant molecules are used as a template, a precursor of the ceramic porous body having an organic-inorganic structure is formed by mixing the micelle template with a ceramic material or a precursor of the ceramic material, and then surfactant molecules or the given organic molecules in the precursor are removed by heating or treatment with an acid. This method is generally called "Supermolecular template method". For example, see Makoto Ogawa, "Supermolecular template method", Coloring materials, 71 (10), pp 646–655, 1998. However, removal of the given organic molecules or the surfactant molecules under heating may cause stress inside the material, which results in troubles such as cracking or peeling. Further, it has been difficult to coat or form a ceramic porous body on a surface of a material having low heat resistance, for example, a plastic material.

SUMMARY OF THE INVENTION

In view of these circumstances, the present inventors have made strenuous researches, and discovered that (1) micelles are formed in liquid by mixing ① surfactant molecules, ② surfactant molecules and given organic molecules, or ③ different kinds of surfactant molecules, (2) a precursor of a ceramic porous body having an organic-inorganic structure is formed through mixing a ceramic material or a precursor of the ceramic material into the liquid containing the micelles, the precursor of the ceramic porous body comprising a template having the micelles arranged in a hexagonal, cubic or lamella form and (3) the surfactant molecules (which may include the given organic molecules) in the precursor of the ceramic porous body are removed by photo-oxidation through irradiating vacuum ultraviolet light upon the precursor to leave an inorganic skeleton alone, and (4) thereby the ceramic porous body having nanometer-scale pores is formed at a low temperature.

As to the surfactant, it is known that it takes various molecular assemblies (liquid crystal-like structures) such as hexagonal, cubic or lamella structures. If the surfactant exceeds its critical micelle concentration, the surfactant molecules first form spherical micelles, and then form rod-shaped micelles through association when the surfactant concentration further increases (See FIG. 1(a)). As the surfactant concentration further increases, the rod-shaped micelles are arrayed at an interval of a few or several nm, for example, thereby forming hexagonal-, cubic- or lamella-structure rheotropic liquid crystals. See FIG. 1(b). Although in FIG. 1(b), only six rod-shaped micelles surround the central one, many rod-shaped micelles surround the central one as in FIG. 1(b). The thus formed micelles uniformly arrayed are used as templates. As to the mesopore structure, it may be formed as follows: First, a ceramic material or the like occupies the spaces among templates and subsequently, organic-inorganic mesostructures would be formed by a chemical interaction. The above is known from "Porous Materials—Characterization, Production and Application—", edited by Y. Takeuchi, Published by FUJI TECHNOSYSTEM CO., LTD. pp 101 to 104, and C. T. Kresage, M. E. Leonowicz, W. J. Roth, J. C. Vartul; and J. S. Beck, Nature 359 (1992) 710–712. Finally, the calcination process eliminates the organic species in such mesostructures, having ceramic material or the like with mesopore structure.

The present inventors have made strenuous researches, and discovered that ① micelles of surfactant molecules, ② micelle of surfactant molecules and given organic molecules coexisting therewith or ③ micelles of different kinds of surfactant molecules are used as a template, a precursor of the ceramic porous body having an organic-inorganic structure is formed by mixing the micelle template with a ceramic material or a precursor of the ceramic material (FIG. 1(c), the surfactant molecules (which may include the given organic molecules) in the precursor of the ceramic porous body are removed by photo-oxidation through irradiating vacuum ultraviolet light upon the precursor to leave an inorganic skeleton alone, and thereby the ceramic porous body having nanometer-scale pores is formed at a low temperature (FIG. 1(d)). The present invention has been accomplished based on this discovery.

That is, the present invention provides a low temperature producing process, which particularly effectively produces the ceramic porous body comprising an inorganic skeleton and having nanometer-scale pores by removing the surfactant molecules (which may include the given organic molecules) in the form of a template as carbon monoxide, carbon dioxide and water by photo-oxidation through irradiation of vacuum ultraviolet light upon it.

In order to solve the above problems, the present invention provide the following countermeasures.

(I) The present invention provides a process for producing the ceramic porous body comprising the steps of (1) forming micelles in liquid by mixing ① surfactant molecules, ② surfactant molecules and given organic molecules, or ③ different kinds of surfactant molecules, (2) forming a precursor of a ceramic porous body having an organic-inorganic structure is formed through mixing a ceramic material or a precursor of the ceramic material into the liquid containing the micelles, the precursor of the ceramic porous body comprising a template having the micelles arranged in a hexagonal, cubic or lamella form and the ceramic material or the ceramic material precursor adsorbed around the micelles, (3) removing the surfactant molecules or the surfactant molecules and the given organic molecules in the precursor of the ceramic porous body by photo-oxidation through irradiating vacuum ultraviolet light upon the precursor to leave an inorganic skeleton alone, and (4) thereby forming the ceramic porous body having nanometer-scale pores at a low temperature.

(II) The present invention further provides a process for producing the ceramic porous body comprising the steps of (1) forming micelles in liquid by mixing ① surfactant molecules, ② surfactant molecules and given organic molecules, or ③ different kinds of surfactant molecules, (2) forming a template comprising the micelles arranged in a hexagonal, cubic or lamella form, (3) forming a precursor of a ceramic porous body having an organic-inorganic structure through mixing a ceramic material or a precursor of the ceramic material into the liquid containing the micelles, the precursor of the ceramic porous body comprising the template and the ceramic material or the ceramic material precursor adsorbed around the micelles, and (4) removing the surfactant molecules or the surfactant molecules and the given organic molecules in the precursor of the ceramic porous body by photo-oxidation through irradiating vacuum ultraviolet light upon the precursor to leave an inorganic skeleton alone, and (5) thereby forming the ceramic porous body is having nanometer-scale pores at a low temperature.

Figure 2:
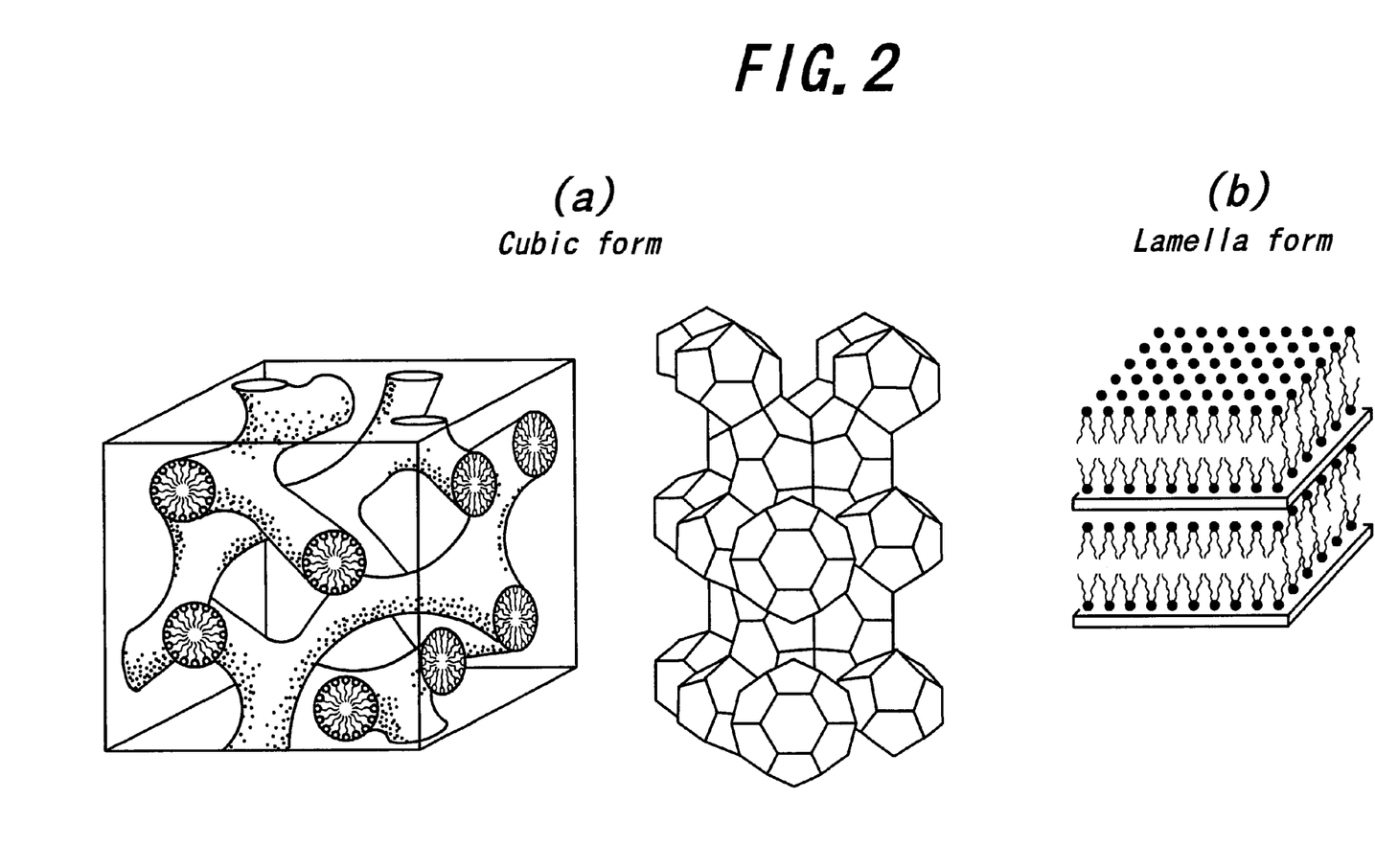
FIGS. 2(a) and 2(b) show cubic forms and a lamella form of micelles.
Figure 3:
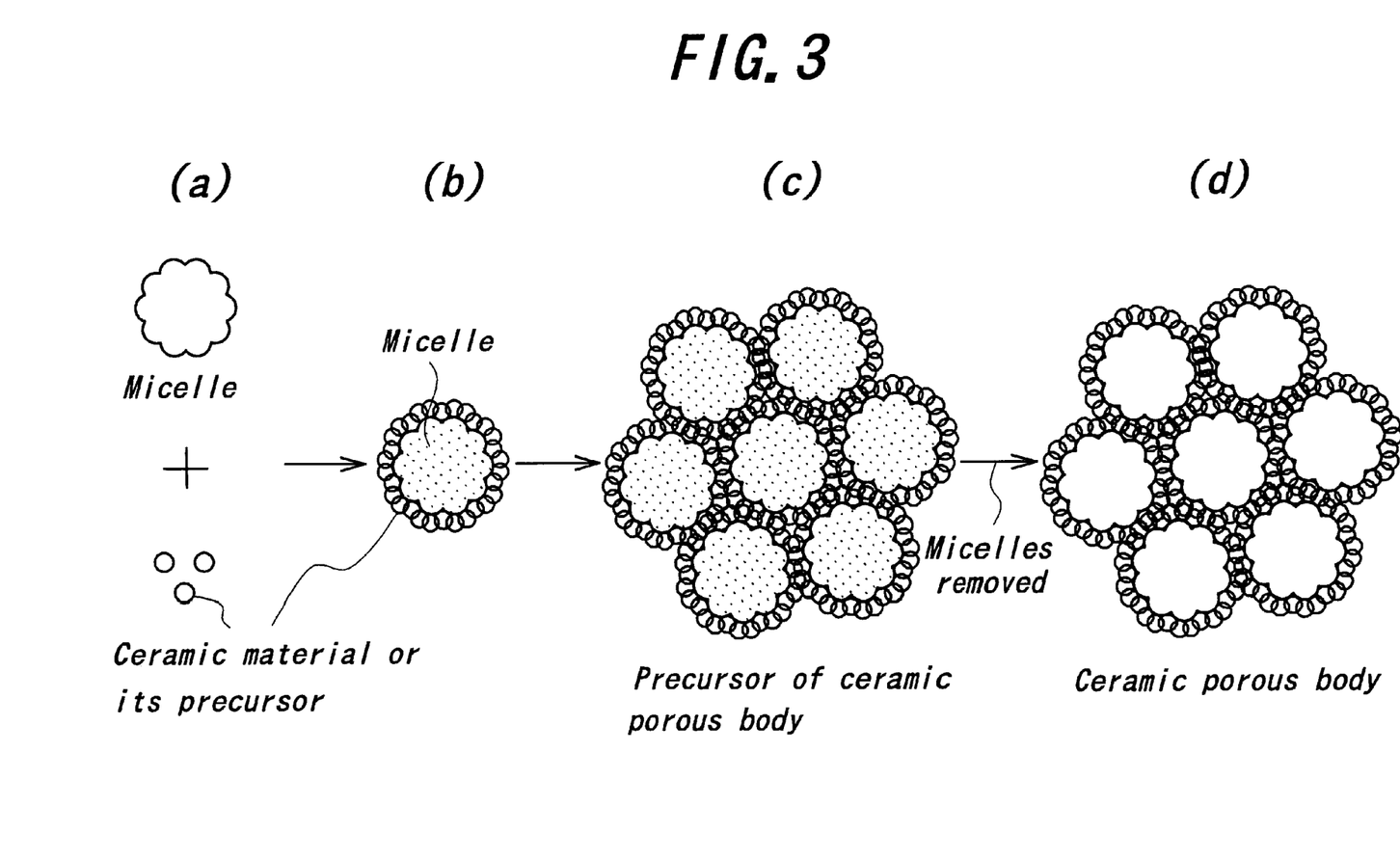
FIG. 3 shows another process for producing the ceramic porous body according to the present invention.

(III) The present invention further provides a process for producing the ceramic porous body comprising the steps of (1) forming micelles in a liquid by mixing ① surfactant molecules, ② surfactant molecules and given organic molecules, or ③ different kinds of surfactant molecules thereinto, (2) forming a precursor of a ceramic porous body having an organic-inorganic structure by mixing a ceramic material or a precursor of the ceramic material into the liquid containing the micelles, the precursor of the ceramic porous body comprises a template having the micelles arranged in a hexagonal, cubic or lamella form and the ceramic material or the ceramic material precursor adsorbed around the micelles, (3) removing the surfactant molecules or the surfactant molecules and the given organic molecules in the precursor of the ceramic porous body by photo-oxidation through irradiating vacuum ultraviolet light upon the precursor to leave an inorganic skeleton alone, and (4) thereby forming the ceramic porous body having nanometer-scale pores at a low temperature. In FIGS., 2(a) and 2(b), a cubic form and a lamella form of the micelles are shown.

The following are preferred embodiments of the process for producing the ceramic porous body according to the present invention.

(1) The ceramic material or its precursor for ceramic porous body having the organic-inorganic structure is selected from materials which allow vacuum ultraviolet light to pass through them.

(2) The ceramic material or its precursor for the precursor of the ceramic porous body having the organic-inorganic structure is selected from materials which absorb vacuum ultraviolet light and emit electrons through their optically catalytic action.

(3) The surfactant molecules in the precursor of the ceramic porous body having the organic-inorganic structure are removed by irradiating vacuum ultraviolet light upon it.

(4) The surfactant molecules in the precursor of the ceramic porous body having the organic-inorganic structure are removed by irradiating vacuum ultraviolet light upon it in an atmosphere at 200° C. or less. If the temperature is 300° C. or more, the surfactant molecules are thermally decomposed, which disturbs the finely porous structure. Therefore, 200° C. or less is employed, considering the safety.

(5) The precursor of the ceramic porous body having the organic-inorganic structure is shaped in a thin filmy form.

(6) The precursor of the ceramic porous body having the organic-inorganic structure is shaped in a finely particulate form.

BRIEF DESCRIPTION OF THE DRAWINGS

For a better understanding of the invention, reference is made to the attached drawings, wherein.

The present invention will be explained in more detail.

Figure 1:
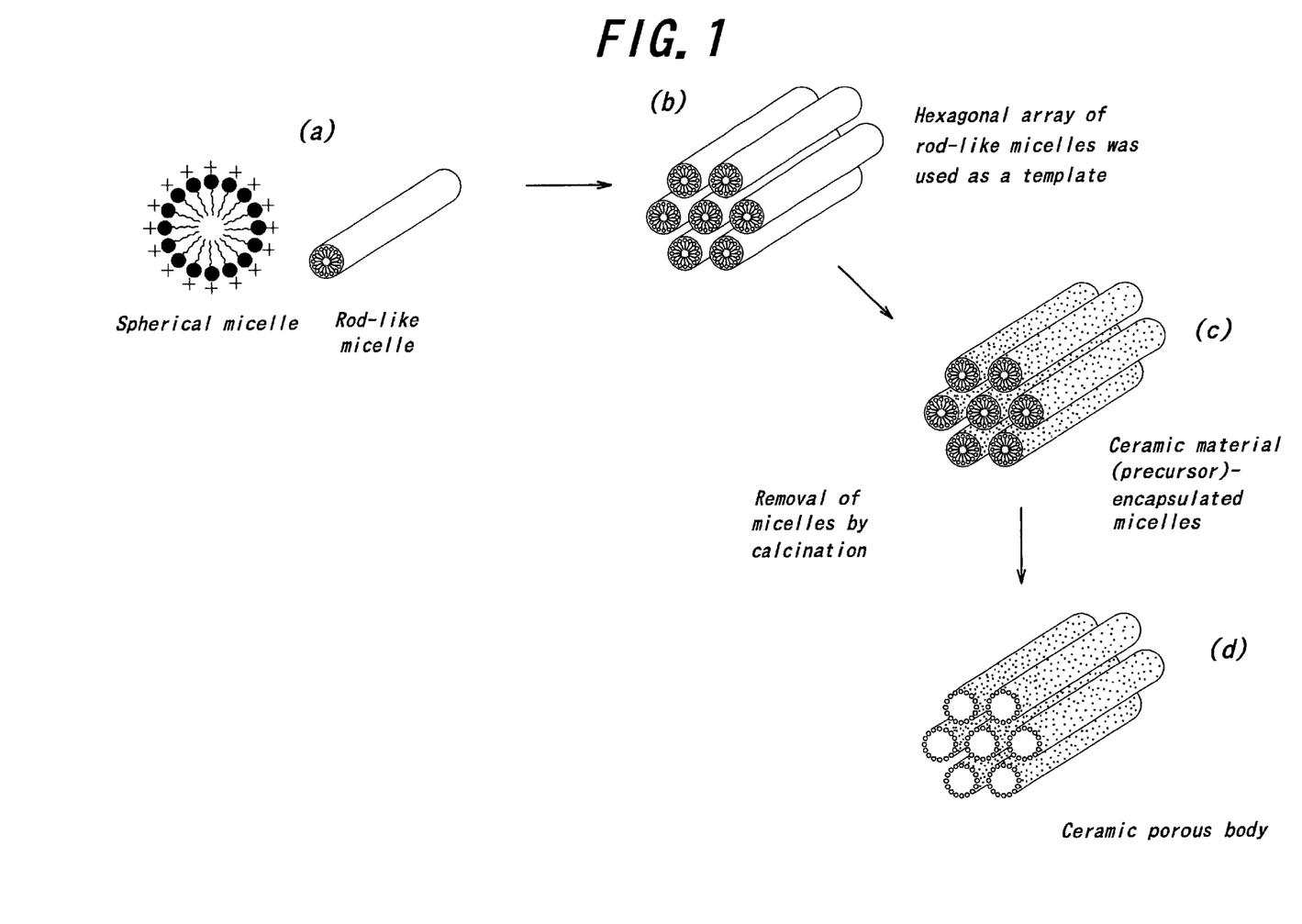
FIG. 1 schematically shows a processes for producing the ceramic porous body according to the present invention.

FIGS. 1 (a) to 1(d) schematically show a first embodiment of the present invention. First, when ① surfactant molecules, ② surfactant molecules and given organic molecules, or ③ different kinds of surfactant molecules are mixed into a liquid at a concentration of a critical micelles concentration thereof or higher, micelles are formed in the form of a spherical shape or a rod-like shape in the liquid through association. See FIG. 1(a). When the concentration of the surfactant molecules (and the given organic molecules) increases, they form templates each having the rod-like micelles arranged in a hexagonal array (FIG. 1(b). Further, when a ceramic material or a precursor of the ceramic material is mixed into the liquid containing the templates, precursors each composed of a ceramic porous body having an organic-inorganic structure and comprising the template and the ceramic material or the ceramic material precursor adsorbed around the micelles are formed (FIG. 1(c). Then, the surfactant molecules or the surfactant molecules and the given organic molecules in the precursor of the ceramic porous body are removed by photo-oxidation through irradiating vacuum ultraviolet light upon the precursor to leave an inorganic skeleton alone, thereby forming the ceramic porous body having nanometer-scale pores at a low temperature (FIG. 1(d).

FIGS. 3(a) to (d) shows a second embodiment of the present invention. First, micelles are formed in a liquid in the same manner as mentioned above, by mixing ① surfactant molecules, ② surfactant molecules and given organic molecules, or ③ different kinds of surfactant molecules thereinto. See an upper side of FIG. 3(a). Then, a precursor of a ceramic porous body having an organic-inorganic structure is prepared by mixing a ceramic material or a precursor of the ceramic material into the liquid containing the micelles, the precursor of the ceramic porous body comprising a template having the micelles arranged in a hexagonal form and the ceramic material or the ceramic material precursor adsorbed around the micelles, (3) removing the surfactant molecules or the surfactant molecules and the given organic molecules in the precursor of the ceramic porous body by photo-oxidation through irradiating vacuum ultraviolet light upon the precursor to leave an inorganic skeleton alone, and (4) thereby forming the ceramic porous body having nanometer-scale pores at a low temperature.

In the present invention, the precursor of the ceramic porous body having the inorganic-organic structure affords the ceramic porous body having the nanometer-scale porous structures through the removal of the surfactant molecules or the given organic molecules or the like constituting the templates by the photo-oxidation. Therefore, the ceramic porous body-producing process according to the present invention has the largest characteristic in that the process can be performed at a low temperature.

(1) Surfactant Molecules

As the surfactant molecules used in the present invention, a alkyltrimethyl ammonium ($C_nH_{2n+1}$++N+$(CH_3)_3$, n=8~18), hexadecyltrimethyl ammonium ions, cetyltrimethyl ammonium chloride, dodecyldimethyl ammonium bromide, etc. may be arbitrarily used, for example.

(2) Ceramic Material or Precursor of the Ceramic Material

An inorganic skeleton such as (2-1) a silica skeleton, (2-2) a titania skeleton or (2-3) an alumina skeleton is formed from a ceramic material or its precursor used to constitute the inorganic skeleton.

(2-1) Silica Skeleton

In order to form the silica skeleton, an silicon alkoxide such as tetramethoxy silane, tetraethoxy silane, tetrabutoxy silane, methyltrimethoxy silane, methyltriethoxy silane, methyltributoxy silane, tetrachloro silane, methyltrichloro silane or the like may be arbitrarily used.

(2-2) Titania Skeleton

In order to form the titania skeleton, a titanium-alkoxide such as titanium tetraisopropoxide, titanium n-butoxide, titanium chloride triisopropoxide, titanium chloride triisopropoxide, titanium dichloride diethoxide, titanium ethoxide, titanium isobutoxide or the like may be arbitrarily used.

(2-3) Aluminum Skeleton

In order to form the alumina skeleton, an aluminum-alkoxide such as aluminum (III) n-butoxide, aluminum (III) s-butoxide, aluminum (III) t-butoxide, aluminum (III) ethoxide, aluminum (III) isopropoxide or the like may be arbitrarily used.

(3) Production of the precursor of the ceramic porous body having the inorganic-organic structure The precursor of the ceramic porous body having the inorganic-organic structure is produced in the form of a thin film or fine particles, for example.

(3-1) Production of the Precursor of the Ceramic Porous Body in the Form of a Thin Film Micelle made of ① surfactant molecules, ② micelles of surfactant molecules and given organic molecules coexisting therewith ③ or the like, or a micelle of different kinds of surfactant molecules. Then, an aqueous solution is obtained by adding an inorganic raw material (a ceramic material or its precursor to be used to form an inorganic skeleton) to the organic solution. In this case, hydrochloric acid used is to gel silicon alkoxide, for example. Next, a substrate is floated on a surface of the solution, thereby heaping the ceramic precursor having the organic-inorganic structure on the substrate at a given thickness. Although a mixing molar ratio is not particularly limited, it may be that the mixing molar ratio of the surfactant molecules: the inorganic raw material: hydrochloric acid: water= 0.5~0.16:0.05~0.15:5~9:80~120. Preferred may be 0.11:0.1:7:100, for example. Particularly, the ratio of the surface-active agent to the inorganic material is preferably 0.5 to 2.

As a substrate, oxides such as quartz, alumina, titania, mica or the like and graphite are preferred. In this case, single crystals of quartz, alumina and titania are preferred. Since active OH groups exist on the surfaces of these oxide substrates, the oxide substrates are preferred, because they are easy to react with the below-mentioned silane coupling agent which is used for coating the substrates. The use of the substrate coated with an organic material is preferred.

As the coating organic material, a silane coupling agent having an alkyl group or a perfluoroalkyl group may be recited as preferred. As a coating method, chemical vapor deposition (CVD), chemical adsorption or Langmuir-Blodget (LB) may be arbitrarily used.

(3-2) Production of the Finely Particulate Precursor of the Ceramic Porous Body

Surfactant molecules, an inorganic raw material (a ceramic material or its precursor to be used to form an inorganic skeleton), hydrochloric acid and water are mixed at an arbitrary ratio, thereby obtaining an aqueous solution as mentioned above. Fine powder of a precursor of a ceramic porous body is obtained by evaporating the obtained aqueous solution to dryness.

(4) Removal of the Surfactant Molecules

Next, the surfactant molecules or the like in the precursor of the ceramic porous body having the organic-inorganic structure deposited on the substrate are removed by the photo-oxidation as mentioned above. The surfactant molecules are removed upon the exposure of it to vacuum ultraviolet light, ozone, plasma or the like. In this case, vacuum ultraviolet light having a short wavelength (excimer lamp, wavelength of 172 nm) is preferably used. In this case, a irradiating time period is preferably 1 hour or more. Further, in order to effectively remove the organic molecules, irradiation is more preferably effected with the vacuum ultraviolet light at an atmospheric temperature of 200° C. or less.

By so doing, C—C bonds, C—H bonds, etc. in the surfactant molecules constituting the templates are degraded, and chemically react with activated oxygen, and scattered off from the precursor of the porous body in the form of carbon monoxide, carbon dioxide and water, resulting in the formation of the ceramic porous body having the mesoporous structure composed of the inorganic skeleton only.

Figure 4:
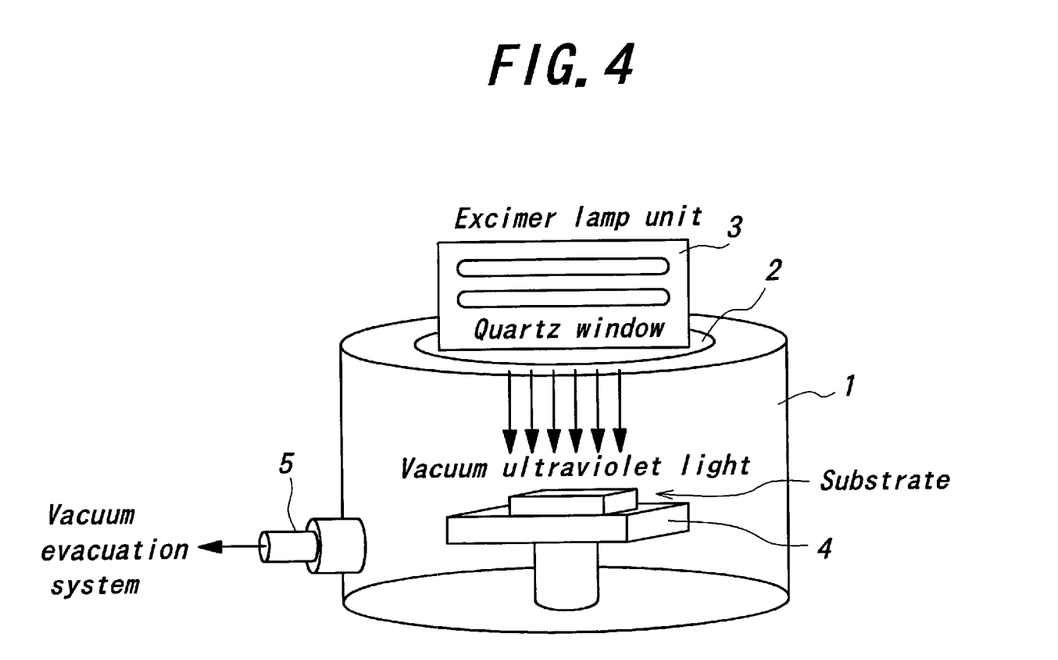
FIG. 4 is a schematic view showing a light-irradiating device in Examples.

FIG. 4 is a schematic view of a light-irradiating device used in the present invention. The light-irradiating device includes a light-irradiating chamber 1 having a quartz window through which ultraviolet light is introduced into the chamber from an excimer lamp unit 3. In the chamber 1, a substrate to be irradiated with ultraviolet light is placed on a supporting table, and the inside of the chamber is evacuated by a vacuum evacuation system through an exhaust outlet 5 at a peripheral wall of the chamber 1.

As mentioned above, according to the present invention, the nanometer-scale ceramic porous body having the hollow structure can be produced by the optical process which can be simply performed in the low temperature range in a clean state with a saved energy.

The reason why the surfactant molecules constituting the templates can be removed by the above-mentioned photo-oxidation treatment at the low temperature is that gases such as carbon monoxide, carbon dioxide and water are generated through chemical reactions between cleaved organic molecules and excited oxygen atoms having extremely strong oxidative reactivity, and are scattered off, owing to synergistic effects that the vacuum ultraviolet light having the wavelength of 172 nm which are generated from the excimer lamp have strong photon energy, the light can easily decompose the chemical bonds in the organic molecules, the vacuum ultraviolet light can be directly absorbed in oxygen in air to effectively form excited oxygen atoms, and the vacuum ultraviolet light effectively form atomic oxygen as ultraviolet light having a wavelength of 185 nm do.

EXAMPLES

In the following, the present invention will be explained in more detail by using examples. These examples are illustrative of preferred embodiments of the present invention, but never limit the invention.

Example 1

Figure 5:
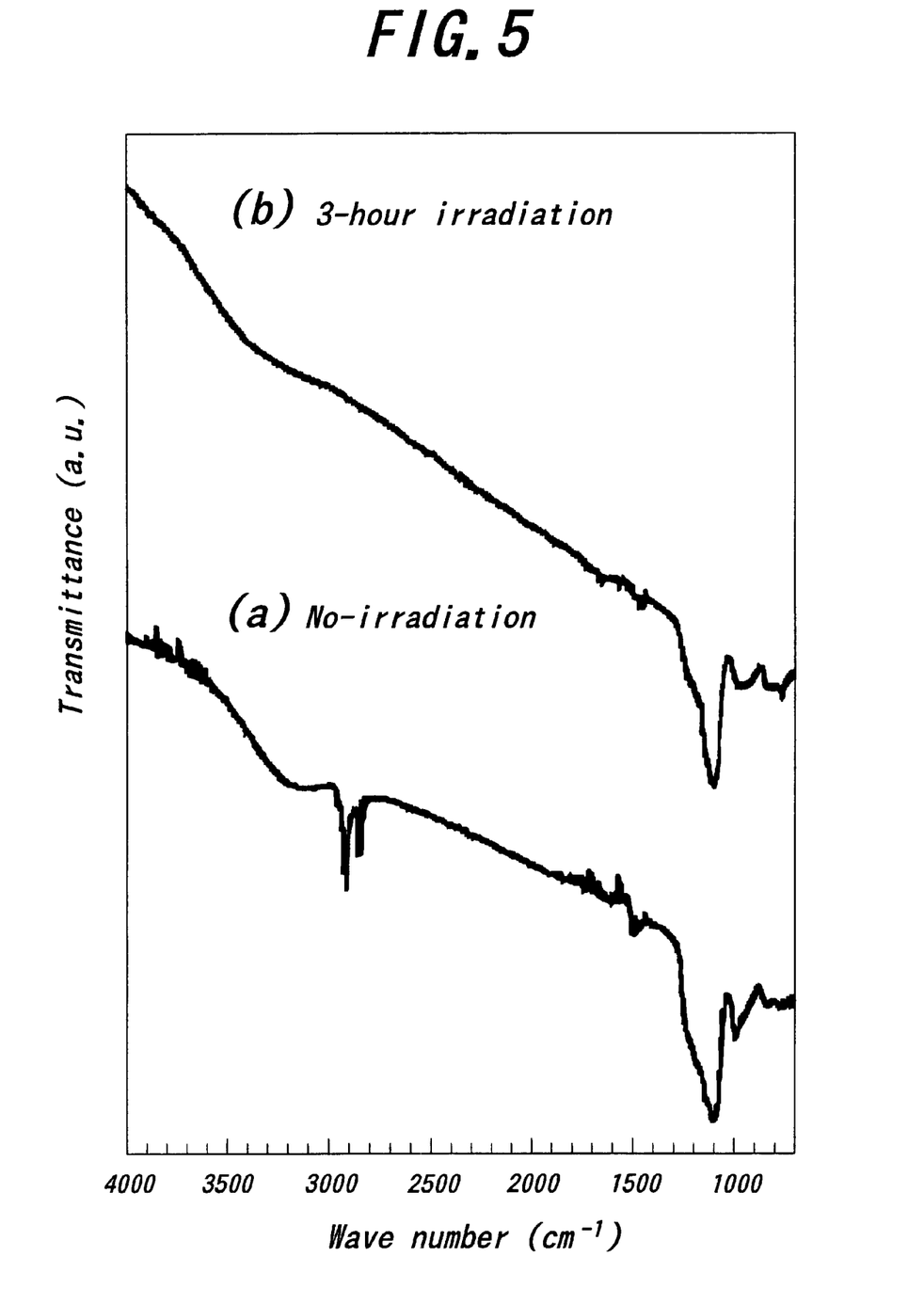
FIG. 5 shows charts of transmitted IR of samples in Example 1 and Comparative Example 1.

Water, hydrochloric acid, cetyltrimethylammonium chloride, and tetraethoxysilane are mixed at a molar ratio of 100:7:0.11:0.1 to prepare a mixed aqueous solution. A silicon substrate was subjected to CVD treatment with octadecyltrimethoxysilane at 150° C. for 3 hours. Next, the CVD-treated silicon substrate was immersed upside down in this mixed aqueous solution, and kept undisturbed at room temperature for 1 hour. The resulting sample was exposed to an excimer lamp (wavelength: 172 nm) at 10 Pa for 3 hours. IR measurement confirmed that C—H stretching vibration attributable to alkyl groups in the surfactant molecules near 2900 $cm^{-1}$ completely disappeared. That is, it is considered that cetyltrimethylammonium chloride as the surfactant molecules were decomposed off to form a silica skeleton. Further, X-ray diffraction (XRD) gave the pore diameter of about 2.98 nm. FIG. 5 show measurement result of transmission IR of the sample in Example 1 and that of a sample in Comparative Example 1. It was confirmed that a heaped but not treated substrate in the following Comparative Example 1 exhibits C—H stretching vibration attributable to alkyl groups in the surfactant molecules near 2900 $cm^{-1}$. On the other hand, absorption near this wavelength was seen for the treated sample, which revealed that the photochemically disappeared.

Example 2

The sample prepared in Example 1 was exposed to the excimer lamp (wavelength: 172 nm) in an atmosphere at 200° C. for 2 hours. IR measurement revealed that C—H stretching vibration attributable to alkyl groups in the surfactant molecules near 2900 $cm^{-1}$ completely disappeared. Further, XRD gave the pore diameter of about 2.80 nm. From Examples 1 and 2, it is seen that when light and heat are simultaneously used, the time required for decomposing off the surfactant molecules is shortened by their synergistic effects.

Comparative Example 1

An inorganic-organic precursor of the silica porous body formed in Example 1 was immersed upside down in the solution at room temperature for one week. IR measurement of the resulting sample confirmed C—H stretching vibration attributable to alkyl groups in the surfactant molecules near 2900 $cm^{-1}$. Further, XRD gave the pore diameter of about 3.58 nm.

Comparative Example 2

An inorganic-organic precursor of the silica porous body formed in Example 1 was maintained in an electric furnace kept at about 200° C. for about 1 hour. IR measurement of the resulting sample confirmed C—H stretching vibration attributable to alkyl groups of the surfactant molecules near 2900 $cm^{-1}$, which revealed that surfactant molecules remained even after the heat treatment. Further, XRD gave the pore diameter of about 3.35 nm. Comparative Example 2 showed that the decomposition of the surfactant molecules is not effected only by heating at 200° C.

Effects of the Invention

As mentioned above in detail, the present invention relates to the process for producing the ceramic porous body, which comprises the steps of (1) forming micelles in liquid by mixing ① surfactant molecules, ② surfactant molecules and given organic molecules, or ③ different kinds of surfactant molecules, (2) forming a precursor of a ceramic porous body having an organic-inorganic structure is formed through mixing a ceramic material or a precursor of the ceramic material into the liquid containing the micelles, the precursor of the ceramic porous body comprising a template having the micelles arranged in a hexagonal, cubic or lamella form and the ceramic material or the ceramic material precursor adsorbed around the micelles, (3) removing the surfactant molecules or the surfactant molecules and the given organic molecules in the precursor of the ceramic porous body by photo-oxidation through irradiating vacuum ultraviolet light upon the precursor to leave an inorganic skeleton alone, and (4) thereby forming the ceramic porous body having nanometer-scale pores at a low temperature. Therefore, according to the present invention, (1) an energy-saved process with no heat energy required can be offered, (2) since no stress occurs owing to contraction inside the material, no trouble such as cracking or peeling occurs in the resulting ceramic porous body having the pore structure, and (3) the ceramic porous body can be formed on a surface of a substrate material having low heat resistance, such as plastics.

What is claimed is:

1. A process for producing a ceramic porous body comprising (1) forming micelles in a liquid by mixing ① surfactant molecules, ② surfactant molecules and organic molecules, or ③ different kinds of surfactant molecules, (2) forming a precursor of a ceramic porous body having an organic-inorganic structure through mixing a ceramic material or a precursor of the ceramic material into the liquid containing the micelles, the precursor of the ceramic porous body comprising a template having the micelles arranged in a hexagonal, cubic or lamella form and the ceramic material or the ceramic material precursor adsorbed around the micelles, (3) removing the surfactant molecules or the surfactant molecules and the organic molecules in the precursor of the ceramic porous body by photo-oxidation solely through irradiating vacuum ultraviolet light upon the precursor of the ceramic porous body to leave an inorganic skeleton alone, and (4) thereby forming the ceramic porous body.

2. The process set forth in claim 1, wherein the ceramic material or the precursor thereof of the ceramic porous body having the organic-inorganic structure is any material selected from materials which allow vacuum ultraviolet light to pass through said materials.

3. The process set forth in claim 1 or 2, wherein the ceramic material or the precursor thereof of the ceramic porous body having the organic-inorganic structure is any materials selected from materials which absorb vacuum ultraviolet light and emit electrons through optically catalytic reaction of said materials.

4. The process set forth in claim 1 or 2, wherein the surfactant molecules in the precursor of the ceramic porous body having the organic-inorganic structure are removed by irradiating vacuum ultraviolet light upon it in an atmosphere at 200° C. or less.

5. The process set forth in claim 1 to 2, wherein the precursor of the ceramic porous body having the organic-inorganic structure is shaped in a filmy form.

6. The process set forth in claim 1 or 2, wherein the precursor of the ceramic porous body having the organic-inorganic structure is shaped in a particulate form.

7. A method of producing a ceramic porous body comprising the steps of:

forming micelles comprised of surfactant molecules, said micelles being dispersed in an aqueous liquid;

adding particles of a ceramic material or a precursor thereof to the liquid containing the micelles;

mixing the liquid containing the micelles and the particles to form an aggregate wherein the micelles are covered with the particles and aggregated;

drying the aggregate; and photo-oxidizing the aggregate solely by irradiating vacuum ultraviolet light to remove the micelles from the aggregate until a porous ceramic structure is formed.

8. The method according to claim 7, wherein the photo-oxidation is conducted at a temperature of 200° C. or less.

9. The method according to claim 7, wherein the micelles are arranged in a hexagonal, cubic, or lamella shape.

10. The method according to claim 7, wherein the liquid further contains hydrochloric acid.

11. The method according to claim 7, wherein the ceramic material or the precursor thereof is a silica, titanium, or aluminum material.

12. The method according to claim 7, further comprising, prior to the drying step, applying the liquid containing the aggregate on a substrate.

* * * * *